United States Patent
Sampigethaya et al.

(10) Patent No.: US 9,515,700 B2
(45) Date of Patent: Dec. 6, 2016

(54) METHODS AND SYSTEMS FOR EXCHANGING INFORMATION BETWEEN AIRCRAFT

(75) Inventors: Radhakrishna G. Sampigethaya, Snoqualmie, WA (US); Timothy M. Mitchell, Seattle, WA (US); Anil L. Kumar, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 732 days.

(21) Appl. No.: 13/587,647

(22) Filed: Aug. 16, 2012

(65) Prior Publication Data

US 2014/0049099 A1 Feb. 20, 2014

(51) Int. Cl.
*H02J 1/00* (2006.01)
*H04B 3/54* (2006.01)

(52) U.S. Cl.
CPC ............... *H04B 3/54* (2013.01); *H04B 3/548* (2013.01)

(58) Field of Classification Search
CPC ................................. H04B 3/54; H04B 3/548
USPC ...... 307/1, 9.1; 370/464, 241; 375/222, 257; 701/1
See application file for complete search history.

(56) References Cited

U.S. PATENT DOCUMENTS

| | | |
|---|---|---|
| 7,546,123 B2 | 6/2009 | Wright et al. |
| 7,769,376 B2 | 8/2010 | Wright et al. |
| 7,893,557 B2 | 2/2011 | Davis et al. |
| 2005/0143868 A1 | 6/2005 | Whelan |
| 2005/0162253 A1* | 7/2005 | Wilson et al. ............... 340/5.2 |
| 2008/0292320 A1* | 11/2008 | Pederson ........... H04B 10/1143 398/128 |
| 2008/0296095 A1* | 12/2008 | Frank ........................... 187/237 |
| 2010/0027515 A1* | 2/2010 | Hylton ......................... 370/338 |
| 2010/0161483 A1* | 6/2010 | Littrell ............... B60L 11/1824 705/40 |
| 2011/0032149 A1 | 2/2011 | Leabman |
| 2012/0099627 A1* | 4/2012 | Mitchell et al. .............. 375/222 |
| 2012/0191830 A1* | 7/2012 | Scheid et al. ................ 709/223 |
| 2012/0268245 A1* | 10/2012 | Alexander ............... B60L 3/12 340/5.82 |

FOREIGN PATENT DOCUMENTS

| | | |
|---|---|---|
| EP | 2445119 A1 | 4/2012 |
| WO | 2008097983 A1 | 8/2008 |

OTHER PUBLICATIONS

International Search Report and Written Opinion of International Application No. PCT/US2013/049095; Sep. 12, 2013; 7 pages.
International Search Report and Written Opinion of International Application No. PCT/US2013/049095; Feb. 26, 2015; 5 pages.

* cited by examiner

*Primary Examiner* — Jared Fureman
*Assistant Examiner* — Alfonso Perez Borroto
(74) *Attorney, Agent, or Firm* — Armstrong Teasdale LLP

(57) ABSTRACT

Methods and systems for use in exchanging information between aircraft at an airport are provided. The system includes a power system capable of providing power to each of the plurality of vehicles via an electric cable, at least one off-board broadband over power lines (BPL) module coupled to the power system. The at least one off-board BPL module is capable of communicating via the electric cable with an onboard BPL module on each of the plurality of vehicles. The system also includes a network coupled to each of the at least one off-board BPL modules for communicatively coupling each of the at least one off-board BPL modules such that the plurality of vehicles can exchange information via the network.

19 Claims, 4 Drawing Sheets

METHODS AND SYSTEMS FOR EXCHANGING INFORMATION BETWEEN AIRCRAFT

BACKGROUND

This invention relates generally to aircraft communication, and more particularly to secure information exchange between aircraft at an airport.

The amount of software and data in onboard airplane information systems is growing at a rapid pace. Onboard airplane information systems use software and data for cabin systems, avionics, and inflight entertainment systems, among other things. Some software and data may be common across commercial aircraft type and an airline fleet. Airlines are responsible for frequently and timely refreshing all data and software of their aircraft fleet.

The availability of aircraft WiFi or cellular links and airport-based and Internet-based software and data distribution servers streamlines the process of managing large software and big data of aircraft. However, such solutions are limited by the cost of managing airline-owned distribution servers at airports, reliance on Internet connectivity to reach airport-owned distribution servers, and dependence on the last-mile wireless networking availability and throughput at airports.

Moreover, there are some commercial aircraft data that cannot be sent via wireless networks due to regulations governing aircraft communications. Such regulations may some day require that certain types of data, such as aircraft encryption keys, only be transferred to an aircraft when the aircraft is parked at an airport gate and other conditions are met. The other conditions may include the aircraft being connected to power via an airplane power stinger at a specific gate.

In addition, any unexpected delays from disruptions in infrastructure availability or performance, such as network or Internet outages and slow Internet connectivity, will degrade flight turn-around performance of an airline fleet. Furthermore, some airports do not have access to the Internet and/or do not have suitable network infrastructures. At such airports, airlines may be forced to fall back to the performance levels of legacy-based mechanisms, e.g., CD-based data/software distribution.

Accordingly, there is a need for methods and systems that enable secure information exchange between aircraft at an airport. More specifically, such methods and systems should enable communication between aircraft without dependence on servers or the Internet.

BRIEF DESCRIPTION

In one aspect, a system for exchanging information between a plurality of vehicles is provided. The system includes a power system capable of providing power to each of the plurality of vehicles via an electric cable, at least one off-board broadband over power lines (BPL) module coupled to the power system. The at least one off-board BPL module is capable of communicating via the electric cable with an onboard BPL module on each of the plurality of vehicles. The system also includes a network coupled to each of the at least one off-board BPL modules for communicatively coupling each of the at least one off-board BPL modules such that the plurality of vehicles can exchange information via the network.

In another aspect, a first aircraft having an onboard BPL module is provided. The onboard BPL module is configured to communicatively couple with an off-board BPL module via an electric cable capable of providing electric power to the first aircraft, initiate communication with the off-board BPL module, the off-board BPL module coupled to a network, and exchange information with a second aircraft via the off-board BPL module.

In yet another aspect, a method is provided. The method includes providing a power network capable of providing power to one or more aircraft, providing a communications network, coupling at least one off-board BPL module to the power network and the communications network, coupling a first aircraft to the power network using a first electric cable, the first aircraft having a first onboard BPL module, and initiating, using the first onboard BPL module, communication with the at least one off-board BPL module via the first electric cable. Information is exchanged with a second aircraft via the off-board BPL module.

The features, functions, and advantages that have been discussed can be achieved independently in various embodiments or may be combined in yet other embodiments further details of which can be seen with reference to the following description and drawings.

DETAILED DESCRIPTION

Embodiments described herein facilitate the secure exchange of information between aircraft at an airport. More particularly, aircraft are enabled to act as a server for other aircraft members of an airline fleet for distributing and collecting information. Updates to software and data systems can be propagated through a fleet from aircraft to aircraft, particularly among similar aircraft models. Updates may include data and software for in-flight entertainment systems, cabin systems, flight bag, flight control systems, and avionics systems.

Aircraft-to-aircraft information exchange occurs after both source and destination aircraft initiate off-board communications. Broadband over power line (BPL) communications links enable inter-aircraft information flows that are secure against physical threats and cyber threats. An off-board BPL module is capable of point-to-point and point-to-multipoint communications with other off-board BPL modules connected to an airport power system. The off-board BPL modules are further capable of communicating with onboard BPL modules on aircraft.

Airport power systems and the physical layout of an airline fleet parked at the airport are leveraged to enhance throughput of aircraft-to-aircraft information flows. A ground power unit that includes an off-board BPL module may be used to power and facilitate communication with one or more aircraft. The off-board BPL module enables real-time peer-to-peer information exchange, point-to-multipoint information exchange, and/or delayed store-and-forward information exchange between and among aircraft. Such off-board BPL modules are secured against malicious insiders, including compromised airline/airport personnel or systems.

Figure 1:
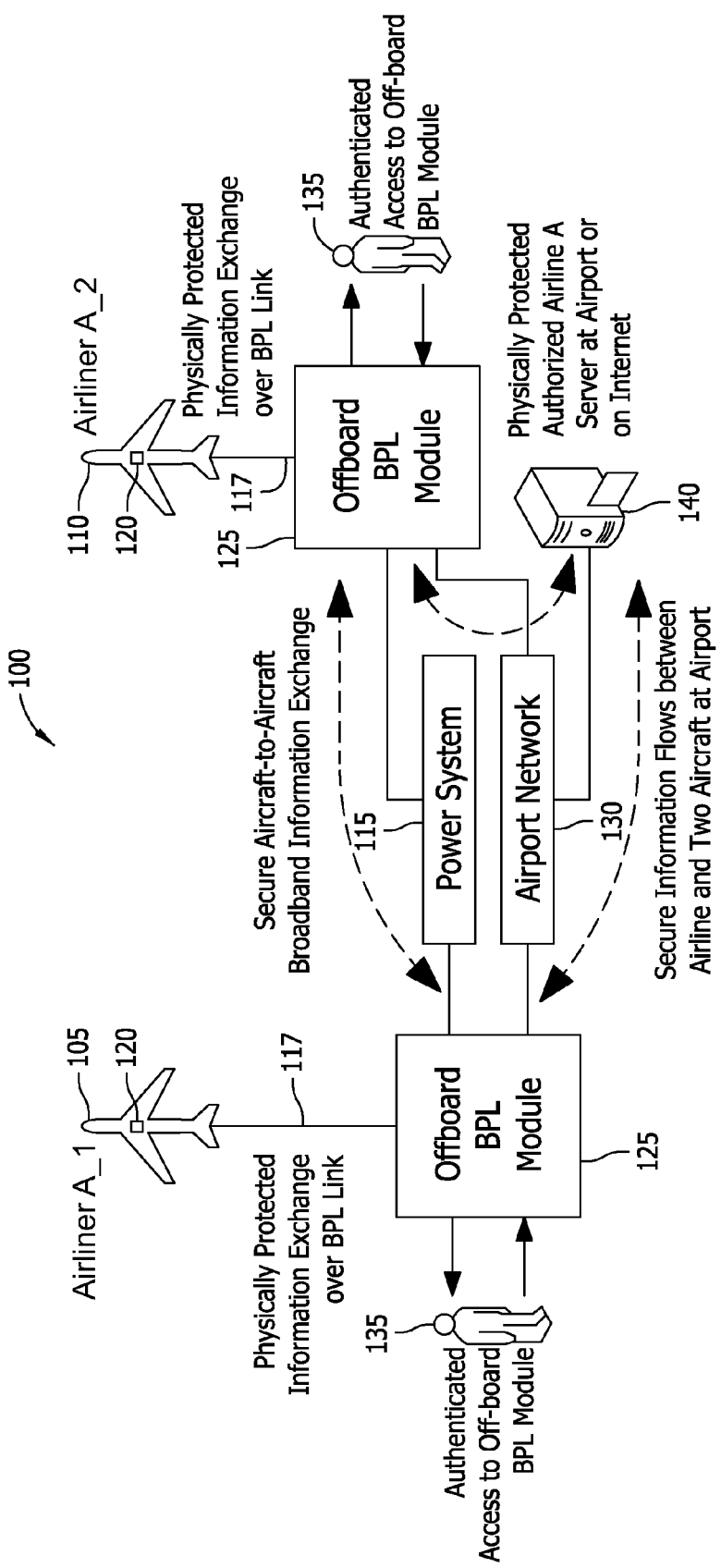
FIG. 1 is a diagram of an exemplary system for exchanging information between aircraft.

FIG. 1 is a diagram of an exemplary system 100 for exchanging information between aircraft. System 100 includes a first aircraft 105 and a second aircraft 110 at an airport (not shown). Alternatively, first and second aircraft 105 and 110 may be at two different airports. While two aircraft are used in FIG. 1, there may be more than two aircraft in system 100. First and second aircraft 105 and 110 may be heterogeneous and diverse.

System 100 includes a power system 115 that is configured to deliver power to aircraft 105 and 110. Power system 115 may be a conventional power delivery system commonly used at airports. Power system 115 is coupled to aircraft 105 and 110 when aircraft 105 and 110 are parked at the airport. An electrical cable 117 couples each aircraft 105 and 110 to power system 115.

Each aircraft 105 and 110 has an onboard broadband power line (BPL) module 120 that facilitates communication via electrical cable 117. More particularly, onboard BPL module 120 is capable of communicating with an off-board BPL module 125 that is coupled to power system 115. Although FIG. 1 illustrates power system 115 being coupled to electrical cable 117 via off-board BPL module 125, it should be appreciated that other configurations that enable off-board BPL module to function as described herein are possible. For example, off-board BPL module 125 may be electrically coupled to power system 115, wherein power system 115 is directly coupled to electrical cable 117. Each off-board BPL module 125 is communicatively coupled to an airport network 130. Off-board BPL modules 125 may be coupled to airport network 130 via Ethernet, frame relay, ISDN, ATM, and/or any other network, whether a LAN, WAN, or VPN.

Thus, via electrical cable 117, each aircraft 105 and 110 can receive electrical power from power system 115 and send/receive communications to/from airport network 130. In the exemplary embodiment, each aircraft 105 and 110 communicates via onboard BPL module 120 using TCP/IP, however other suitable protocols may be used. Electrical cable 117 may be physically secured to facilitate physical security of communications between aircraft 105 and 110 and airport network 130. Moreover, encryption may be employed to further secure communications between aircraft 105 and 110 and airport network 130.

In the exemplary embodiment, physical access by a user 135 to off-board BPL module 125 is restricted. Physical access may be restricted by a secure enclosure, described in more detail herein, that requires successful authentication, via credentials, multi-factor crew authentication, digital keys, passcodes, RFID, biometrics, etc., to gain physical access to off-board BPL module 125. Off-board BPL module 125 may include a GPS receiver for verifying that off-board BPL module 125 has not been moved from a pre-determined position. Off-board BPL module 125 may be configured with a secure routing table that facilitates routing information via airport network 130 using pre-determined hops and/or pre-determined destinations. More particularly, off-board BPL module 125 may be configured to route information to pre-determined aircraft using a pre-determined off-board BPL module. Off-board BPL modules 125 may be identified and/or addressed by a hardware identifier such as a MAC address. Off-board BPL module 125 may include a display and input devices, such as a keyboard, touch screen, mouse, etc., (not shown) for providing a user interface, as described in more detail herein.

Airport network 130 may be communicatively coupled to a server 140 that may be operated by the airline that operates aircraft 105 and 110. Alternatively, server 140 may be operated by a third-party, such as the airport, an aircraft manufacturer, or an aircraft service provider. Server 140 may be connected to airport network 130 via a LAN, WAN, and/or the Internet. Server 140 may be configured to provide and receive data to and from aircraft 105 and 110. For example, server 140 may provide software and/or firmware updates to components of aircraft 105 and 110, such as cabin systems software, flight bag, and avionics software. Server 140 may also provide content, such as music and movies, for in-flight entertainment systems on aircraft 105 and 110.

In addition to communication between server 140 and aircraft 105 and 110, system 100 enables information exchange between aircraft 105 and 110. More particularly, and as explained in more detail herein, first aircraft 105 and second aircraft 110 can communicate via BPL modules 120 and 125 and via airport network 130.

Figure 2:
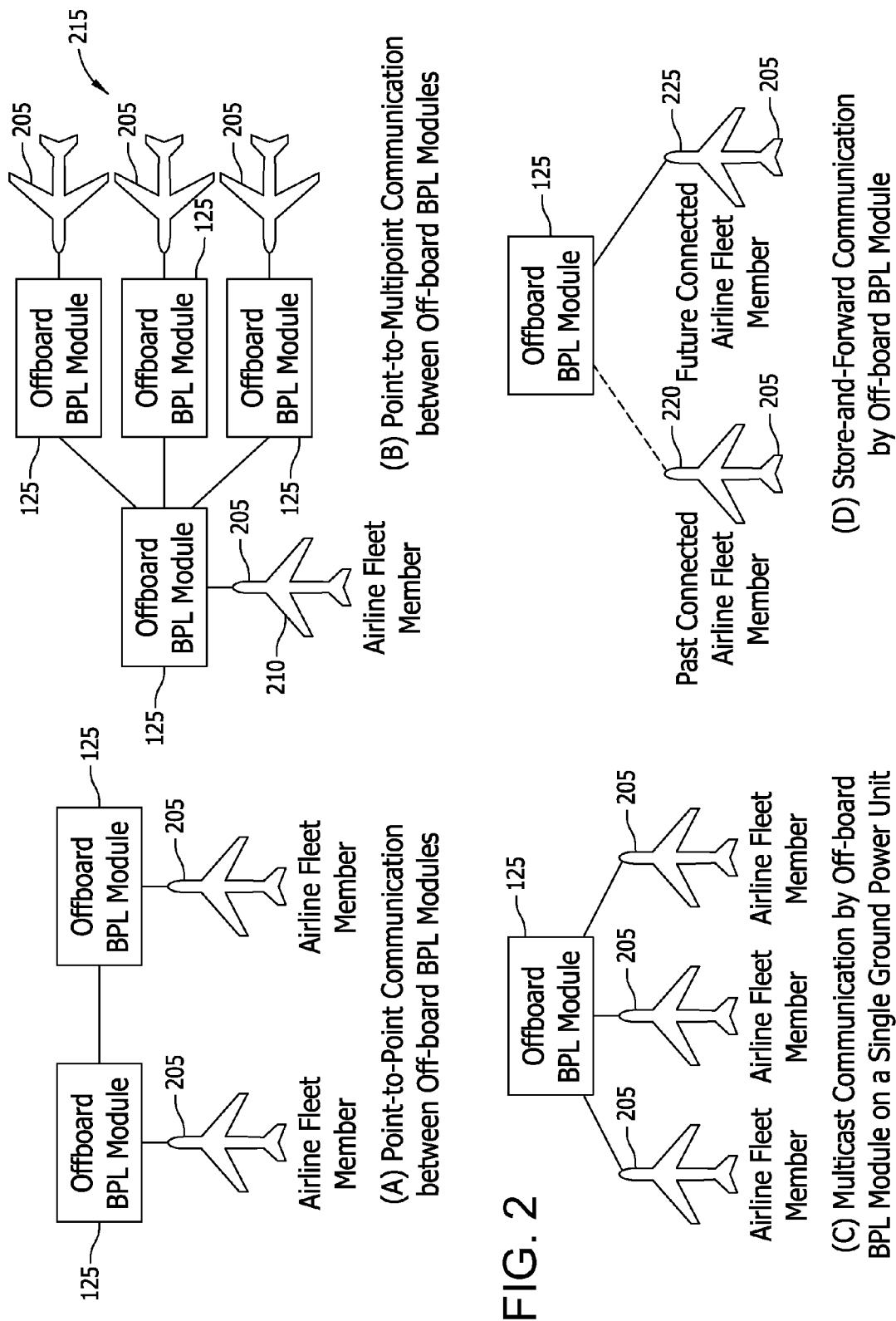
FIG. 2 illustrates exemplary configurations of the system in FIG. 1 using two or more aircraft.

FIG. 2 illustrates exemplary uses of system 100 using two or more aircraft 205. In configuration (A), two aircraft 205 are communicatively coupled via two off-board BPL modules 125. Configuration (A) illustrates point-to-point communication between aircraft 205 wherein data is directly transmitted between aircraft 205 via airport network 130 (shown in FIG. 1). In configuration (B), a plurality of aircraft 205 are each coupled to off-board BPL modules 125. Off-board BPL modules 125 are in communication with each other, e.g., via airport network 130 (shown in FIG. 1). An originator 210 is capable of broadcasting data to two or more receivers 215 simultaneously.

In configuration (C), two or more aircraft 205 are coupled to a single off-board BPL module 125. Off-board BPL module 125 may be configured to receive data and broadcast it simultaneously (i.e., multicast) to the two or more aircraft 205. In configuration (D), non-contemporaneous communication is illustrated between an initial aircraft 220 and a subsequent aircraft 225. Initial aircraft 220 transmits data to off-board BPL module 125 for storage at off-board BPL module 125, a memory device coupled to off-board BPL module 125, and/or a server communicatively coupled to off-board BPL module 125 (e.g., server 140). Off-board BPL module 125 causes the transmitted data to be stored. When subsequent aircraft 225 is coupled to off-board BPL module 125, the stored data may be transmitted to subsequent aircraft 225. Thus, off-board BPL module 125 enables data storage and a store-and-forward data delivery system. Accordingly, information exchange is enabled between aircraft 205 that are not at an airport at the same time.

Figure 3:
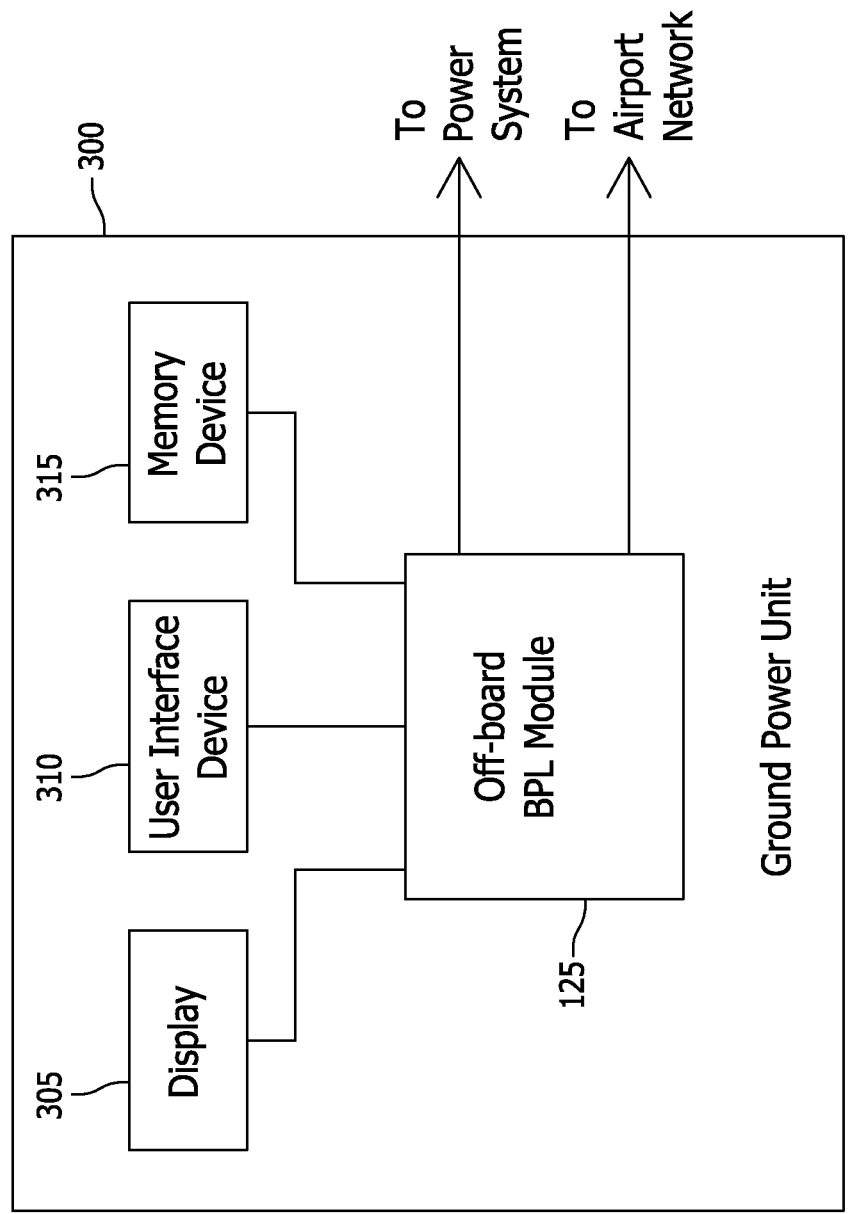
FIG. 3 is a diagram of a ground power unit for use with the system in FIG. 1.

FIG. 3 is a diagram of an exemplary ground power unit 300 for use with system 100. Ground power unit 300 includes off-board BPL module 125, as described herein. In the exemplary embodiment, off-board BPL module 125 is coupled to a display 305, a user interface device 310, and a memory device 315. Display 305 may be a CRT, LCD, or any suitable device for displaying information to a user. User interface device 310 may be a touchscreen, keyboard, touchpad, multi-touch enabled surface, mouse, any other user input device, or any combination thereof. Memory device 315 may be either volatile or non-volatile, such as a hard disk, SSD, RAM, EEPROM, etc. Ground power unit 300 may be a secure enclosure that provides physical security and environmental protection to off-board module 125. Each gate at an airport may have a ground power unit 300 for the aircraft parked at the gate.

During operation, referring to FIGS. 1, 2, and 3, each aircraft 105 and 110 parks at a gate and is connected to a ground power unit (GPU), e.g., ground power unit 300, by authorized ground personnel via electric cable 117, e.g., a power stinger cable. Each ground power unit 300 includes an off-board BPL module, e.g., off-board BPL module 125. The authorized ground personnel activates off-board BPL module 125, e.g., by a switch (not shown), and completes an authentication procedure using off-board BPL module 125, display 305, and/or user interface device 310. A pilot, maintenance crewmember, or other authorized user activates an onboard BPL module, e.g., onboard BPL module 120, using, for example, a switch or other control interface. Onboard BPL module 120 establishes communication with off-board BPL module 125. Each aircraft 205 is thereby independently connected to off-board BPL modules 125 via electric cable 117 for the purpose of connecting to other aircraft 125, an airport network, e.g., airport network 130, a server, e.g., server 140, and/or the Internet.

The authenticated user, i.e., the authorized ground personnel, may be provided with an interface, e.g., via display 305 and/or user interface device 310, to provide a selection of a next hop of off-board BPL module 125. Alternatively, or additionally, the pilot or other user may be provided an interface, e.g., via a display and user interface device in aircraft 205 (not shown), for determining or consenting to a next hop for off-board BPL module 125. Off-board BPL module 125 acts as a switch or router for securely establishing a connection with the determined next hop off-board BPL module 125 or acts as a simple relay to an already securely established onboard BPL module.

Communication between aircraft 205 may be initiated autonomously or at the direction of a user, such as a pilot or ground crew member. Aircraft 205 may broadcast, via off-board BPL module 125, a message announcing the presence of the aircraft 205. Alternatively, aircraft 205 may broadcast a discovery message to which other aircraft 205 announce their presence. Thus, the discovery of aircraft 205 communicable via off-board BPL module 125 may be ad-hoc. Each aircraft 205 may be directly addressable, e.g., via MAC address, IP address, etc., or addressable in groups of two or more, e.g., multicast broadcasts to subnets or groups of aircraft 205.

Figure 4:
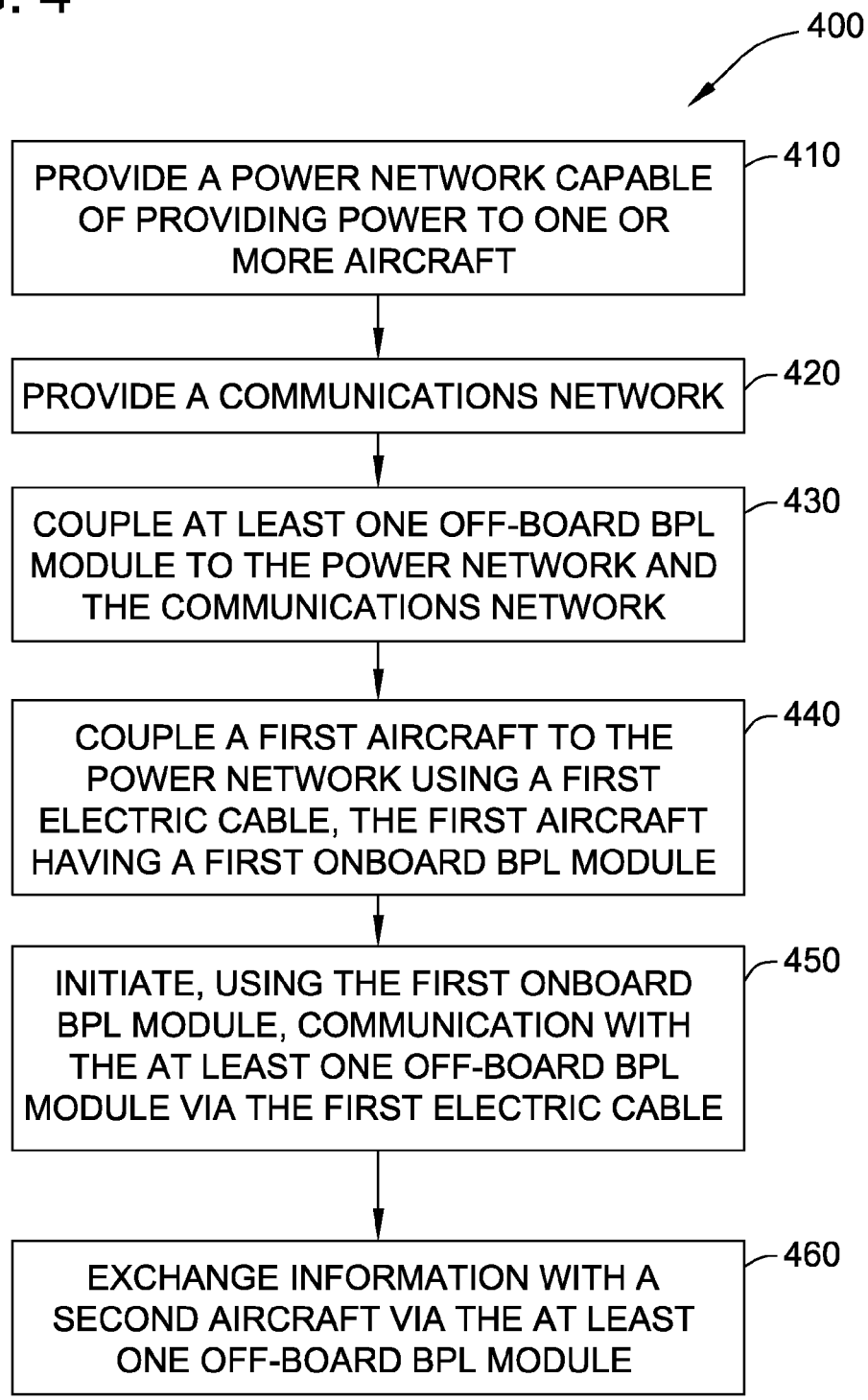
FIG. 4 is a flowchart of an exemplary method for exchanging information between aircraft.

FIG. 4 is a flowchart of an exemplary method 400 for exchanging information between aircraft. Method 400 includes providing 410 a power network capable of providing power to one or more aircraft. A communications network is provided 420. At least one off-board BPL module is coupled 430 to the power network and the communications network. A first aircraft is coupled 440 to the power network using a first electric cable. The first aircraft has a first onboard BPL module. The method 400 includes initiating 450, using the first onboard BPL module, communication with the at least one off-board BPL module via the first electric cable. Information is exchanged 460 with a second aircraft via the at least one off-board BPL module.

Accordingly, exemplary embodiments enable the secure exchange of information between aircraft. As compared to known methods and systems that are used for airport-based aircraft communication, the above-described systems and methods enable an aircraft to be an information source for other aircraft. Unlike off-board wireless communication systems, which cannot enable peer-to-peer communication between aircraft, the above-described systems and methods allow participating aircraft to securely initiate communications and establish a peer-to-peer information exchange, independent of an online intermediate server.

By enabling aircraft to be an information source for other aircraft in an airline fleet and enabling inter-aircraft information exchange over BPL communication links, the above-described embodiments facilitate fault tolerance against unavailability of the Internet and airport networks. Scalability is also enhanced, in terms of both time and cost, for increased global operations of an airline fleet. Information can be propagated through a fleet using the above-described embodiments. Although aircraft have been used as an example throughout, it is contemplated that other vehicles, such as electric vehicles, may be used with the methods and systems described herein.

It will be understood by those of skill in the art that information and signals may be represented using any of a variety of different technologies and techniques (e.g., data, instructions, commands, information, signals, bits, symbols, and chirps may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present disclosure have been described in detail, it will be understood by those skilled in the art that various modifications can be made therein without departing from the spirit and scope of the disclosure as set forth in the appended claims.

A controller, computing device, or computer, such as described herein, including the on and off-board BPL modules, may include at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for exchanging information between a first vehicle and a second vehicle, said system comprising:
    a power system configured to provide power to the first vehicle and the second vehicle via respective electric cables; and
    at least one off-board broadband over power lines (BPL) module coupled to said power system, said at least one off-board BPL module configured to:
        communicate via the respective electric cables with an onboard BPL module on each of the first vehicle and the second vehicle,
        establish a BPL communication link between the first vehicle and the second vehicle;
        receive information from the first vehicle; and
        transmit the received information to the second vehicle.

2. A system in accordance with claim 1, further comprising a network coupled to each of said at least one off-board BPL modules for communicatively coupling each of said at least one off-board BPL modules to facilitate exchange of information between the first vehicle and the second vehicle via said network.

3. A system in accordance with claim 2, further comprising a server coupled to said network.

4. A system in accordance with claim 1, wherein said at least one off-board BPL module is configured to communicate in a point-to-point configuration.

5. A system in accordance with claim 1, wherein said at least one off-board BPL module is configured to communicate in a point-to-multipoint configuration.

6. A system in accordance with claim 1, wherein said at least one off-board BPL module is configured in a multicast configuration.

7. A system in accordance with claim 1, wherein said at least one off-board BPL module is configured in a store-and-forward configuration.

8. A system in accordance with claim 1, wherein each of said at least one off-board BPL modules is coupled to a display and a user interface device.

9. A system in accordance with claim 8, wherein each of said at least one off-board BPL modules is configured to require user authentication.

10. A first aircraft comprising an onboard BPL module configured to:
    communicatively couple with an off-board BPL module via an electric cable configured to provide electric power to said first aircraft;
    initiate communication with the off-board BPL module; and
    exchange information with a second aircraft via a BPL communication link established between said first aircraft and said second aircraft by the off-board BPL module.

11. A first aircraft in accordance with claim 10, wherein said onboard BPL module is further configured to initiate communication with the off-board BPL module after receiving a user input.

12. A first aircraft in accordance with claim 10, wherein the off-board BPL module is configured to communicate in a point-to-point configuration.

13. A first aircraft in accordance with claim 10, wherein the off-board BPL module is configured to communicate in a point-to-multipoint configuration.

14. A first aircraft in accordance with claim 10, wherein the off-board BPL module is configured in a multicast configuration.

15. A first aircraft in accordance with claim 10, wherein the off-board BPL module is configured in a store-and-forward configuration.

16. A method comprising:
    providing a power network configured to provide power to one or more aircraft;
    providing a communications network;
    coupling at least one off-board BPL module to the power network and the communications network;
    coupling a first aircraft to the power network using a first electric cable, the first aircraft having a first onboard BPL module;
    initiating, using the first onboard BPL module, communication with the at least one off-board BPL module via the first electric cable;
    establishing a BPL communication link between the first onboard BPL module and a second onboard BPL module on a second aircraft using the at least one off-board BPL module; and
    receiving information from the first aircraft; and
    transmitting the received information to the second aircraft via the BPL communication link.

17. A method in accordance with claim 16, further comprising coupling the second aircraft to the power network using a second electric cable, the second aircraft having a second onboard BPL module.

18. A method in accordance with claim 17, further comprising exchanging information between the first aircraft and the second aircraft using the communications network.

19. A method in accordance with claim 18, wherein exchanging information comprises exchanging at least one of software and data of at least one of in-flight entertainment systems, avionics systems, flight control systems, flight bag, and cabin systems.

* * * * *

UNITED STATES PATENT AND TRADEMARK OFFICE
CERTIFICATE OF CORRECTION

PATENT NO.         : 9,515,700 B2                                              Page 1 of 1
APPLICATION NO.    : 13/587647
DATED              : December 6, 2016
INVENTOR(S)        : Sampigethaya et al.

It is certified that error appears in the above-identified patent and that said Letters Patent is hereby corrected as shown below:

On the Title Page

Item (75), Inventors, Line 3, please delete "L."

Signed and Sealed this
Fifth Day of September, 2017

Joseph Matal
*Performing the Functions and Duties of the*
*Under Secretary of Commerce for Intellectual Property and*
*Director of the United States Patent and Trademark Office*